April 2, 1935. R. D. CHASE ET AL 1,996,323
BRAKE SHOE GAUGE
Filed Feb. 25, 1931  2 Sheets-Sheet 2
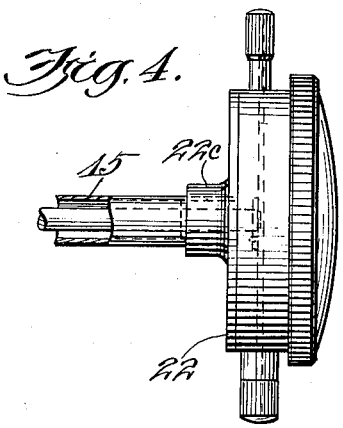
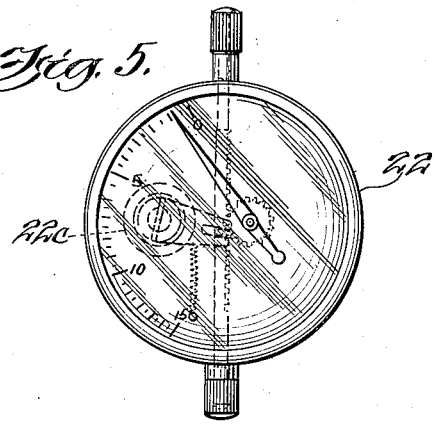
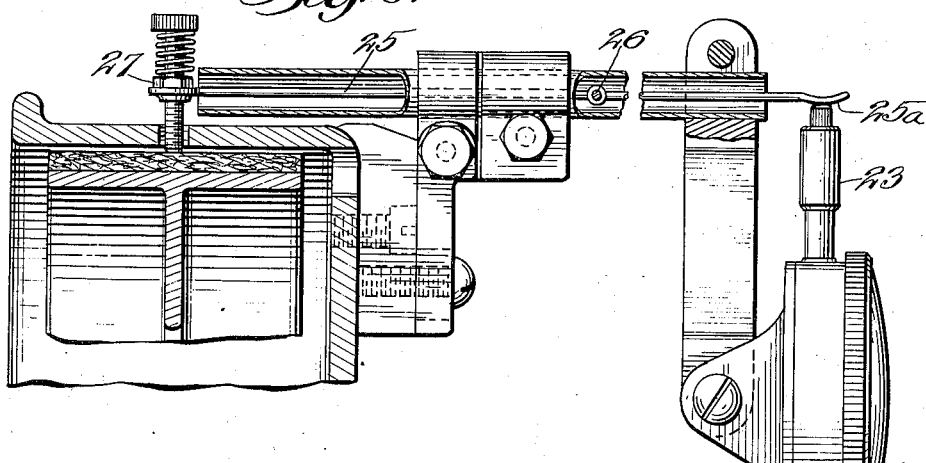
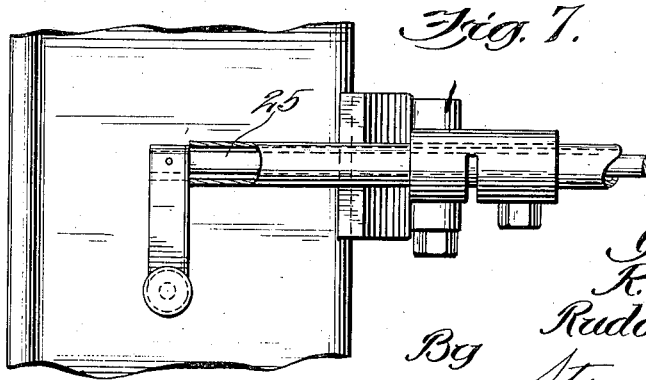
Inventors:
R. D. Chase
Rudolph J. Olson
By Stevens and Batchelor
Attys.

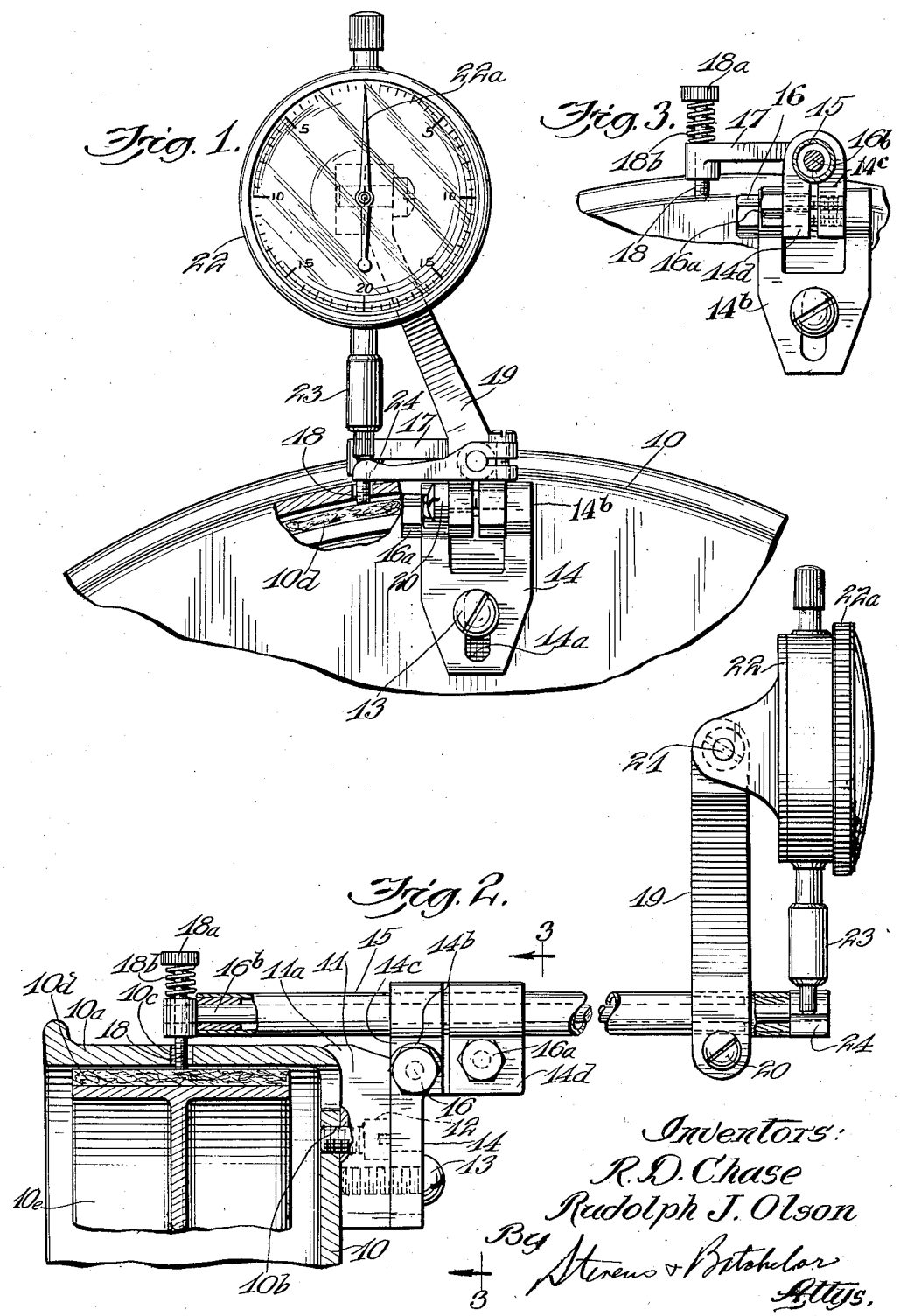

Patented Apr. 2, 1935

1,996,323

UNITED STATES PATENT OFFICE 1,996,323

BRAKE SHOE GAUGE

Russell D. Chase and Rudolph J. Olson, Summit, Ill.

Application February 25, 1931, Serial No. 518,233

4 Claims. (Cl. 33—180)

Our invention relates to automobile brakes and more particularly to appliances for determining the amount of clearance between the brake shoe and drum, and our main object is to provide an appliance of this kind which facilitates the uniform adjustment of the brake shoe.

A further object of the invention is to adapt the novel gauge to the conventional internal brake for the purpose of supplanting the common gauge now in use.

A still further object of the invention is to design the novel gauge with a support which is readily applicable to the conventional brake drum, eliminating the necessity of special attachments for or radical changes in the design of the brake drum.

Another object of the invention is to locate the control of the novel gauge by way of a perforation in the rim of the brake drum.

An additional object of the invention is to so apply the novel gauge as to have it in a fixed and easily viewed position while all of the shoes in a given brake are adjusted.

A final but nevertheless important object of the invention is to design the novel gauge with parts which are few, simple and of rugged construction.

With the above objects in view and any others that may suggest themselves from the specification and claims to follow, a better understanding of the invention may be had by reference to the accompanying drawings, in which—

Fig. 1 is an elevation of the top fragment of a typical brake drum as viewed from the outer side of the automobile, the novel gauge being shown as mounted;

Fig. 2 is a side view of the embodiment in Figure 1, taken from the left, and showing the brake in section;

Fig. 3 is a detail section on the line 3—3 of Fig. 2;

Figs. 4 and 5 are, respectively, a side view and front view of a modification; and Figs. 6 and 7, are, respectively, a sectional side view and a fragmental plan view of another modification.

Since the advent of four-wheel brakes for automobiles, and especially internal brakes having two or more shoes in each brake, the matter of adjusting the shoes has become more complicated. It will be realized that it is insufficient to equalize the four brakes in a machine without adjusting each brake individually to secure the uniform application of its shoes to the drum. With automobiles designed for high speed, this adjustment should be as nearly accurate as possible in order to insure a quick stop in case of emergency.

In carrying out the adjustment of brake shoes, shop rules have demanded the use of the conventional feeler gauge, but the handling of a gauge of this kind so frequently taxes the patience of the mechanic that he soon decides to get along without it, simply depending on his own judgment whether the adjustment is sufficient. Usually, if the shoe does not "grab" the mechanic is satisfied that the adjustment is completed, the relations of the toe or heel of the particular shoe to the drum being problematical. As a matter of fact, these relations are of prime importance, since the engaging surface of the shoe depends largely for its area upon the adjustment of the toe and heel of the shoe relative to the brake drum. The latter running in a perfect circle, generally speaking, is considered as a constant, and that brake is efficient which engages a maximum of shoe surface with drum.

In carrying out the invention, particular reference may first be had to Figures 1 to 3 of the drawings. In these figures, the conventional brake drum is indicated at 10 and is peripheral flange at 10a. Drums of this type are for internal-brake use, and are usually made with a slot by way of which a standard feeler gauge is insertable, and a tapped perforation 10b for a screw which secures a dust cap over the slot while the brake is in use. I make use of this perforation to attach a base block 11 to the face of the drum, this block being countersunk to receive a bolt 12 flushly, and the latter screwing into the perforation to firmly secure the block to the brake drum. The block is preferably extended to fit over the top curvature of the drum as indicated at 11a in Fig. 2, so as to secure a snug fit of the block with the drum.

Shortly below the bolt 12, the block 11 is horizontally perforated with a tapped bore to receive a screw 13 from the front. Between the head of the screw and the block is a plate 14 which is perforated with a vertical slot 14a to permit the passage of the bolt shank. Thus, the relation of the plate with the block is such that by slightly loosening the screw 13, the plate 14 may be raised or lowered somewhat and also swung to change its position laterally, the advance of the screw then serving to fix the plate in the desired position.

The plate 14 is extended upwardly with spaced flanges 14b which receive between them a bracket 14c whose upper portion is perforated for the passage of a tubular housing 15. The lower part of the bracket is clamped to and pivotally adjustable in the plate flanges 14b by a cross bolt 16. One side of the bracket is also extended forwardly, and the extension is formed with a companion jaw 14d about the tubular housing, with a cross bolt 16a to clamp the housing to the extension. The bolt 16 therefore holds the angular adjustment, and the bolt 16a the longitudinal one, of the housing 15.

The tubular housing 15 extends rearwardly to a point over the center of the drum flange 10a and has journaled within it a shaft 16b. The rear end of the shaft projects from the housing to be extended with a radial arm 17, the outer end of this arm being vertically tapped for a threaded pin 18. The latter has a knurled head 18a at its upper end and receives a coil spring 18b between the arm and the head. Thus, the head may be used for the vertical adjustment of the pin to project a greater or lesser distance from below the arm 17, the spring 18b serving to engage the head 18a frictionally whereby to maintain the pin in any position to which it has been adjusted. For the purposes of our gauge, we have seen fit to perforate the flange 10a of the brake drum with a tapped bore 10c, through which the lower portion of the pin 18 is adapted to pass, and which is of a larger diameter than the pin that the latter may freely clear the flange. Figure 2 shows the relation of the pin 18 with the drum flange, and indicates that the lower end of the pin 18 is in contact with the shoe 10d of a braking unit 10e. When our gauge is not applied, a short screw or plug may be applied to the perforation 10c to close it and prevent access of water or dust to the interior of the brake drum.

Frontally of the bracket 14, the tubular housing 15 extends a suitable distance for handy access by the mechanic, receiving a bracket 19 by suitable clamping means 20. The bracket extends in an upward direction and has fastened to it at 21 a standard dial gauge 22. This type of gauge has its dial adjustable in a rotary direction by means of the knurled rim 22a; and the pointer 22b of the gauge is controlled by the movement of a plunger 23 which extends from the gauge and is projected to a predetermined limit by the force of a spring within the gauge. In the present embodiment, the plunger 23 extends downwardly to meet a finger 24 radially extended from the frontal end of the shaft 16b where the latter projects from the tubular housing 15. As both the radial arm 17 and the radial finger 24 are fixed to the shaft—and projected parallel to each other—it will be seen that any movement imparted the pin 18 by the brake shoe 10d will be transmitted to the gauge by the finger 24 whereby to affect the pointer 22a accordingly.

In order to apply the above structure and action to the testing of the brake, it is necessary to turn the brake drum and its gauge attachment to a point where the pin is opposite the toe of a given brake unit within the drum. Now, the brake is applied fully, which action induces a corresponding movement in the pointer 22a of the gauge. Now the dial of the gauge is turned to locate the zero legend of its scale in line with the pointer. When the brake is now released, the amount of travel of the pointer will indicate relatively the amount of departure of the shoe toe from the drum flange. By calibrating the gauge scale to represent thousandths or other fractions of an inch in the movement of the pin 18, the amount of clearance is determined between the shoe toe and the drum flange and the braking unit adjusted to increase or decrease this amount as standards of clearance dictate. A similar operation ensues when the drum is given a further turn to line the pin 18 up with the heel of the same shoe; and, should the latter adjustment in any way prejudice the first one, a brief return movement of the testing apparatus may be made to check up before the adjustment of the shoe is considered terminated. It is thus seen that when the novel gauge is once attached to a brake drum, it may remain in place until the shoes of each braking unit are tested and properly adjusted. Obviously, the adjustment of the plate 14 with the block 11 is for the purpose of properly alining the pin 18 relative to the perforation 10c or to take up any irregularity or inaccuracy in that respect.

In the modification of Figures 4 and 5, the frontal part of the attachment is changed to directly connect the gauge with the shaft housing 15. Thus, the gauge is made with an offset hub 22c which is attached directly to the front end of the tubular housing 15, the shaft 16b extending into the gauge to operate the same as indicated by dotted lines in Fig. 5, this being another method by which gauges of this kind are operated. This modification is desirable for reasons of compactness.

The modification of Figures 6 and 7 is designed with the gauge in a pendent position relative to the main embodiment, the shaft 16b being replaced by a lever 25 medially pivoted at 26 in the tubular housing 15. The rear end of the lever 25 receives a pin similar to the corresponding structure in the main embodiment, although a lock nut 27 for the pin has been added to make up for lack of sufficient bearing for the pin. The front end of the lever 25 is slightly convexed as indicated at 25a for suitable contact with the gauge plunger 23 when the lever assumes an angular position. It will be obvious from Fig. 6 that the movement of the pin 18 will be transmitted by a pivotal action to the plunger 23. This modification is desirable in an alternative sense, and also to do away with the provision of the shaft and bearings therefor.

It will be seen that a gauge constructed on the lines described is a valuable adjunct for the scientific adjustment of automobile brakes. The dial reflects unfailingly the exact amount of clearance of the brake shoe at any portion of its surface, and it is an easy matter to determine to an accurate degree the condition of the brake before and after it is adjusted, making it possible for the mechanic to know exactly what to do for each unit in the brake and to guarantee the adjustment of each brake to regulation requirements. The novel gauge is a radical departure from the conventional feeler gauge which is easily confused when a number of gauges of different values are about, resulting in mistakes. Also, the feeler gauge is a thing which is hard to pick up off the floor between one's fingers on account of its thinness, and frequently becomes twisted or distorted when the brake drum is turned, making it necessary to get a new gauge to complete the job. Finally, the novel gauge is an article which is simple, compact, and of a rugged nature so as to be handled with ease by anyone and to operate efficiently for long periods.

We claim:—

1. A tester for a brake including a peripherally-perforated drum comprising, a support attachable to the drum, an indicator applicable to the brake shoe by way of the drum perforation and including a tubular housing, a bracket slidably disposing the latter and pivotally connected to the support, means to fix the pivotal adjustment of the bracket, an extension of the latter, and a clamp co-operating with the extension to fix the longitudinal adjustment of the housing.

2. The structure of claim 1, and spaced flanges extended from the support and receiving the bracket therebetween to make said pivotal connection.

3. The structure of claim 1, the extension being alongside the housing, and the clamp being a companion jaw formed about the housing from the extension.

4. A testing device for brakes comprising means for attaching the device to the head of a brake drum, said device including a bracket structure pivoted to said means for mounting the same for movement about a horizontal axis, a feeler pin and a gauge connected therewith carried by the bracket structure, the latter including means for adjusting the pin and gauge axially of the brake drum, said pin arranged to contact the periphery of the brake shoe with the gauge measuring the peripheral clearance of the brake shoe from the drum.

RUSSELL D. CHASE.
RUDOLPH J. OLSON.